United States Patent
Greenberger

(10) Patent No.: US 11,010,419 B2
(45) Date of Patent: May 18, 2021

(54) INTERNET OF THINGS DEVICE GRAPHICAL PRESENTATION MODIFICATION

(71) Applicant: INTERNATIONAL BUSINESS MACHINES CORPORATION, Armonk, NY (US)

(72) Inventor: Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 16/106,302

(22) Filed: Aug. 21, 2018

(65) Prior Publication Data
US 2020/0065393 A1 Feb. 27, 2020

(51) Int. Cl.
| | | |
|---|---|---|
| *G06F 16/438* | (2019.01) | |
| *G06Q 30/02* | (2012.01) | |
| *G06Q 30/06* | (2012.01) | |
| *G06F 16/29* | (2019.01) | |
| *G06F 16/958* | (2019.01) | |

(52) U.S. Cl.
CPC ............ *G06F 16/438* (2019.01); *G06F 16/29* (2019.01); *G06F 16/958* (2019.01); *G06Q 30/0261* (2013.01); *G06Q 30/0643* (2013.01)

(58) Field of Classification Search
CPC ...... G06F 16/438; G06F 16/958; G06F 16/29; G06Q 30/0261; G06Q 30/0643
USPC ....................................................... 707/722
See application file for complete search history.

(56) References Cited

U.S. PATENT DOCUMENTS

| | | | | |
|---|---|---|---|---|
| 9,591,451 | B1 * | 3/2017 | Knight | ..................... H04L 67/20 |
| 10,134,084 | B1 * | 11/2018 | Gabriele | .................. G06F 3/017 |
| 2004/0051680 | A1 * | 3/2004 | Azuma | ................... G03B 13/28 |
| | | | | 345/8 |
| 2004/0267612 | A1 * | 12/2004 | Veach | ..................... G06Q 30/02 |
| | | | | 705/14.52 |
| 2009/0309712 | A1 * | 12/2009 | Miller | .................... G08B 25/14 |
| | | | | 340/521 |
| 2010/0302042 | A1 * | 12/2010 | Barnett | .................. G08B 21/24 |
| | | | | 340/573.1 |
| 2014/0358666 | A1 | 12/2014 | Baghaie et al. | |
| 2016/0357522 | A1 * | 12/2016 | Wee | .......................... G06F 8/34 |
| 2016/0358216 | A1 * | 12/2016 | Glover | ............... G06Q 30/0261 |
| 2018/0033045 | A1 * | 2/2018 | Flynn | .................... H04W 4/025 |

(Continued)

FOREIGN PATENT DOCUMENTS

| | | | | | |
|---|---|---|---|---|---|
| WO | WO-2014124606 A1 * | 8/2014 | ......... | G06Q 30/0261 |
| WO | 2016061626 | | 4/2016 | | |

*Primary Examiner* — Mohammad S Rostami
*Assistant Examiner* — Robert F May
(74) *Attorney, Agent, or Firm* — Schmeiser, Olsen & Watts; Stephanie Carusillo

(57) ABSTRACT

A method and system for improving sensor triggered event presentation is provided. The method includes associating a sequence of sensor triggered events associated with a graphical presentation for an object and detecting that a user has accessed a structure associated with an entity. In response, automated sensors associated with the structure are enabled and specified events triggered by the user are detected. A modified graphical presentation associated with an original graphical presentation for the object is generated and presented to the user. An associated a notification is generated and transmitted to a vendor associated with the product.

25 Claims, 10 Drawing Sheets

(56) References Cited

U.S. PATENT DOCUMENTS

2018/0158112 A1* 6/2018 Hertel .................. G06Q 20/306
2018/0163388 A1* 6/2018 Staton ................... A61B 5/207
2018/0182025 A1* 6/2018 Smith ................ G06Q 30/0623
2019/0108548 A1* 4/2019 Gaither ............. G06Q 30/0261

* cited by examiner

INTERNET OF THINGS DEVICE GRAPHICAL PRESENTATION MODIFICATION

FIELD

The present invention relates generally to a method for presenting a sensor triggered event and in particular to a method and associated system for improving Internet of things (JOT) device hardware and software technology associated with sensor triggered events by automatically detecting a user device and associated positioning information for improving an efficiency with respect to mobile device communications.

BACKGROUND

Processes for presenting graphical advertisements are well known. A typical advertisement presentation environment for companies with respect to users typically includes a static presentation format. A large number of solutions currently exist with respect to presenting accurate advertisements with respect to proximate devices. For example, advertisements may be modified based on a type or state of a device. Alternatively, advertisements may be modified based on a user behavior detected after receiving an advertising promotion.

However, the aforementioned solutions may be associated with accurate presentation limitations and speed of access issues thereby limiting a performance of advertisement systems. Additionally, the aforementioned solutions may not be enabled to allow for accurate graphical presentation modifications.

Accordingly, there exists a need in the art to provide a process for automatically detecting a user device and associated positioning information. Additionally, there exists a need in the art to provide a specialized graphical user interface for modifying and presenting modified graphical presentations.

SUMMARY

A first aspect of the invention provides a physical sensor triggered event presentation improvement method comprising: associating, by a processor of a hardware device, a sequence of sensor triggered events with a graphical presentation for an object; detecting, by the processor via a plurality of virtual sensors of the hardware device, that a user of the hardware device has accessed a virtual structure associated with an entity; enabling, by the processor based on the detecting, a plurality of automated virtual sensors associated with the virtual structure; detecting, by the processor via the plurality of automated virtual sensors, specified events of the sequence of sensor triggered events triggered by the user via the hardware device; generating, by the processor based on the detecting, a modified graphical presentation associated with the graphical presentation for the object; presenting, by the processor to the user, the modified graphical presentation; generating, by the processor, a notification indicating the modified graphical presentation and an associated compensation action; and transmitting, by the processor to a vendor associated with the object, the notification.

A second aspect of the invention provides a computer program product, comprising a computer readable hardware storage device storing a computer readable program code, the computer readable program code comprising an algorithm that when executed by a processor of a hardware device implements a physical sensor triggered event presentation improvement method, the method comprising: associating, by the processor, a sequence of sensor triggered events with a graphical presentation for an object; detecting, by the processor via a plurality of sensors of the hardware device, that a user of the hardware device has entered a physical structure associated with an entity; enabling, by the processor based on the detecting, a plurality of automated physical sensors associated with the physical structure; detecting, by the processor via the plurality of automated sensors, specified events of the sequence of sensor triggered events triggered by the user via the hardware device; generating, by the processor based on the detecting, a modified graphical presentation associated with the graphical presentation for the object; presenting, by the processor to the user, the modified graphical presentation; generating, by the processor, a notification indicating the modified graphical presentation and an associated compensation action; and transmitting, by the processor to a vendor associated with the object, the notification.

A third aspect of the invention provides a hardware device comprising a processor coupled to a computer-readable memory unit, the memory unit comprising instructions that when executed by the computer processor implements a virtual sensor triggered event presentation improvement method comprising: associating, by the processor, a sequence of sensor triggered events with a graphical presentation for an object; detecting, by the processor via a plurality of virtual sensors of the hardware device, that a user of the hardware device has accessed a virtual structure associated with an entity; enabling, by the processor based on the detecting, a plurality of automated virtual sensors associated with the virtual structure; detecting, by the processor via the plurality of automated virtual sensors, specified events of the sequence of sensor triggered events triggered by the user via the hardware device; generating, by the processor based on the detecting, a modified graphical presentation associated with the graphical presentation for the object; presenting, by the processor to the user, the modified graphical presentation; generating, by the processor, a notification indicating the modified graphical presentation and an associated compensation action; and transmitting, by the processor to a vendor associated with the object, the notification.

A fourth aspect of the invention provides a physical sensor triggered event presentation improvement method comprising: associating, by a processor of a hardware device, a sequence of sensor triggered events with a graphical presentation for an object; detecting, by the processor via a plurality of sensors of the hardware device, that a user of the hardware device has entered a physical structure associated with an entity; enabling, by the processor based on the detecting, a plurality of automated physical sensors associated with the physical structure; detecting, by the processor via the plurality of automated sensors, specified events of the sequence of sensor triggered events triggered by the user via the hardware device; generating, by the processor based on the detecting, a modified graphical presentation associated with the graphical presentation for the object; presenting, by the processor to the user, the modified graphical presentation; generating, by the processor, a notification indicating the modified graphical presentation and an associated compensation action; and transmitting, by the processor to a vendor associated with the object, the notification.

A fifth aspect of the invention provides a computer program product, comprising a computer readable hardware storage device storing a computer readable program code, the computer readable program code comprising an algorithm that when executed by a processor of a hardware device implements a physical sensor triggered event presentation improvement method, the method comprising: associating, by the processor, a sequence of sensor triggered events with a graphical presentation for an object; detecting, by the processor via a plurality of sensors of the hardware device, that a user of the hardware device has entered a physical structure associated with an entity; enabling, by the processor based on the detecting, a plurality of automated physical sensors associated with the physical structure; detecting, by the processor via the plurality of automated sensors, specified events of the sequence of sensor triggered events triggered by the user via the hardware device; generating, by the processor based on the detecting, a modified graphical presentation associated with the graphical presentation for the object; presenting, by the processor to the user, the modified graphical presentation; generating, by the processor, a notification indicating the modified graphical presentation and an associated compensation action; and transmitting, by the processor to a vendor associated with the object, the notification.

The present invention advantageously provides a simple method and associated system capable of accurately modifying and presenting modified graphical presentations.

DETAILED DESCRIPTION

Figure 1:
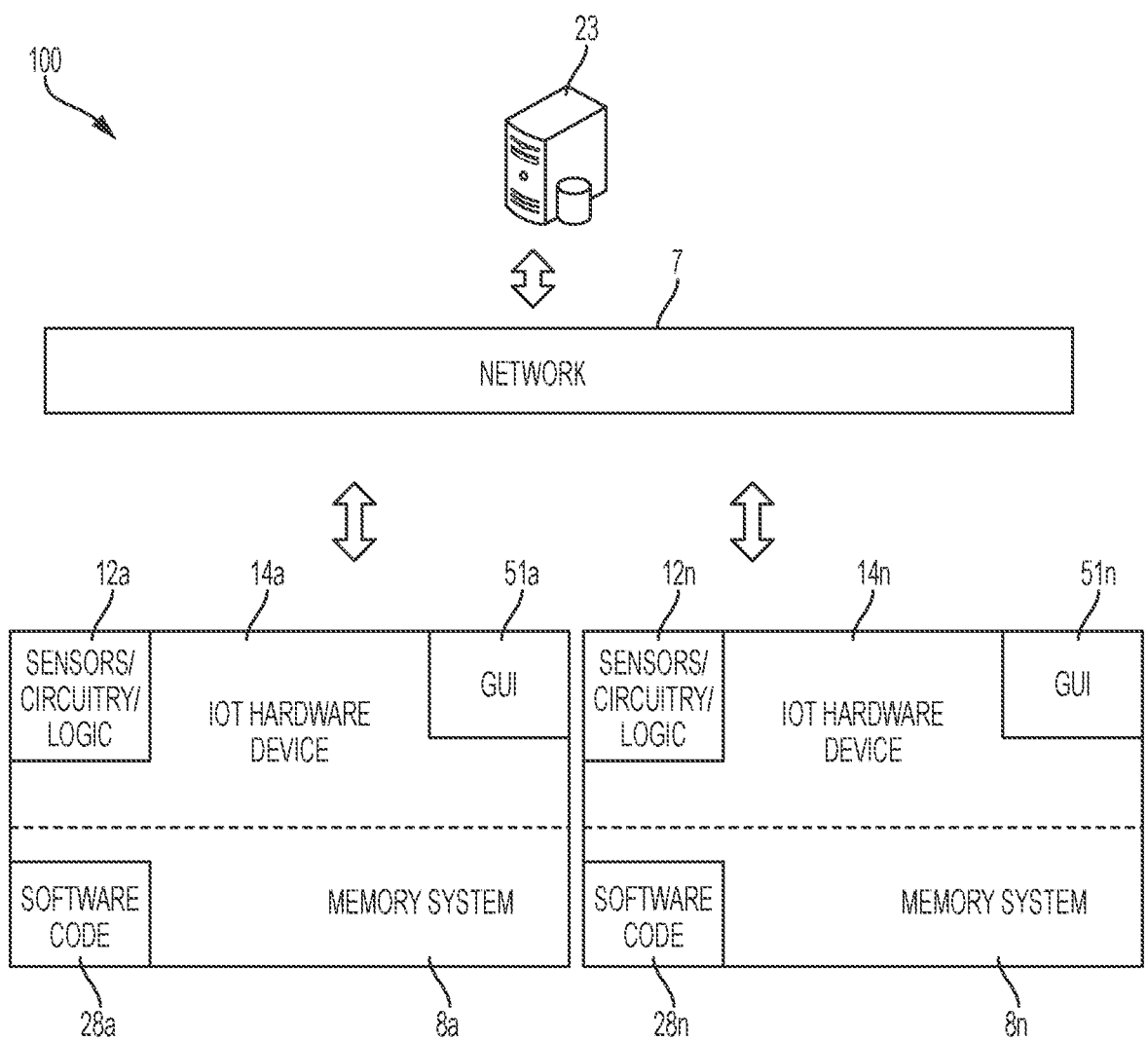
FIG. 1 illustrates a system for improving IoT device hardware and software technology associated with virtual sensor triggered events by automatically detecting a user device and associated positioning information for improving an efficiency with respect to IoT device communications, in accordance with embodiments of the present invention.

FIG. 1 illustrates a system 100 for improving Internet of things (IoT) device hardware and software technology associated with virtual sensor triggered events by automatically detecting a user device and associated positioning information for improving an efficiency with respect to IoT device communications, in accordance with embodiments of the present invention. System 100 is enabled to automatically generate targeted promotions for users based on digital information retrieved virtually via IoT hardware devices 14a . . . 14n and receive compensation from promoters for each promotion accessed by a user. System 100 enables a process that includes:

1. Associating a sequence of detected (virtual) sensor triggered events with an advertisement for a product and automatically displaying the advertisement to a user executing an associated sensor triggered event.

2. Generating a modified (digital) version of the advertisement based at least one executed (by the user via the IoT device) virtual sensor triggered event.

3. Transmitting (to the user) a first notification associated with the modified version of the advertisement.

4. Transmitting (to the advertiser) a second notification associated with compensation (e.g., via digital means) for transmitting the first notification.

System 100 of FIG. 1 includes a server hardware device (or hardware system) 23 connected through a network 7 to IoT hardware devices 14a . . . 14n. IoT hardware device 14a comprises sensors/circuitry/logic 12a, a graphical user interface (GUI) 51a, and a (specialized) memory system 8a. Memory system 8a comprises software code 28a. Memory system 8a may include a single memory system. Alternatively, memory system 8a may include a plurality of memory systems. IoT hardware device 14n comprises sensors/circuitry/logic 12n, a GUI 51n, and a (specialized) memory system 8n. Memory system 8n comprises software code 28n. Memory system 8n may include a single memory system. Alternatively, memory system 8n may include a plurality of memory systems. Server hardware device 23 and IoT hardware devices 14a . . . 14n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 23 and IoT hardware devices 14a . . . 14n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-8. The specialized discrete non-generic analog, digital, and logic based circuitry (e.g., sensors/circuitry/logic 12a . . . 12n, etc.) may include proprietary specially designed components (e.g., a specialized integrated circuit, such as for example an Application Specific Integrated Circuit (ASIC) designed for only implementing an automated process for improving IoT device hardware and software technology associated with sensor triggered events by automatically detecting a user device and associated positioning information for improving an efficiency with respect to IoT device communications. Sensors/circuitry/logic 12a . . . 12n may include any type of internal or external sensors including, inter alia, GPS sensors, social network code based sensors, voltage sensors, network traffic sensors, etc. Network 7 may include any type of network including, inter alia, a local area network, (LAN), a wide area network (WAN), the Internet, a wireless network, etc.

System 100 enables the following process for virtually routing notifications based of detected virtual sensor triggered events:

The process is initiated when a promoter (e.g., a retailer) accesses a specified digital service (e.g., an advertising service). In response, the retailer registers (with the specified digital service) as a sensing publisher entity and identifies associated virtual locations/sites (i.e., IoT technology events) associated with the advertising service. Additionally, differing types of utilized IoT sensing technologies are identified. For example, utilized IoT sensing technologies may include, inter alia, Wi-Fi sensing technology, triangulation sensing technology, Bluetooth beacon sensing technology, smart shelf sensing technology, video camera detection sensing technology, augmented reality trigger sensing technology, etc. The registered retailer builds an infrastructure within system 100 to communicate and collect/capture all virtually detected IoT technology events. Optionally, the registered retailer may specify parameters/limitations with respect to types of advertisements authorized for triggering. For example, parameters/limitations may include, inter alia, restricting content associated with a specific topic, restricting content associated with certain media types (e.g., images), restricting notifications for transmission during specified time frames, restricting advertisements to locally available products, etc. Alternatively, server hardware device 23 may include an IoT analytics system for analyzing virtually detected IoT technology events to formulate trends (e.g., via generated specialized computer code) for the sensing inputs. Additionally, system 100 may be enabled for generating a public facing website for allowing digital advertisers to generate virtual advertisement campaigns. In response, an advertisement is generated and physical or virtual locations for event triggering are selected for generation of funneled (i.e., directed via a specialized network) IoT technology events. Physical IoT technology events may include, inter alia, physical location types (e.g., grocery stores), specific physical locations (e.g., Store #123), specified geo boundaries, etc. Generation of funneled IoT technology events may include: identifying an initialization event hardware/software node; identifying X number of following event hardware/software nodes; and identifying a termination event node with an output action including specialized digital tasks such as, inter alia, push notification, an email, a digital signage software update, receipt coupon integration, etc. System 100 is further enabled for determining compensation for digitally notifying targeted individuals at each hardware/software node comprised by the specialized network. The compensation may be determined based on analyzing the virtually detected IoT technology events. Optionally, a flush event may be identified. A flush event is defined herein as an action that triggers an advertisement in response to a specified event with respect to the funneled IoT technology events.

Figure 2:
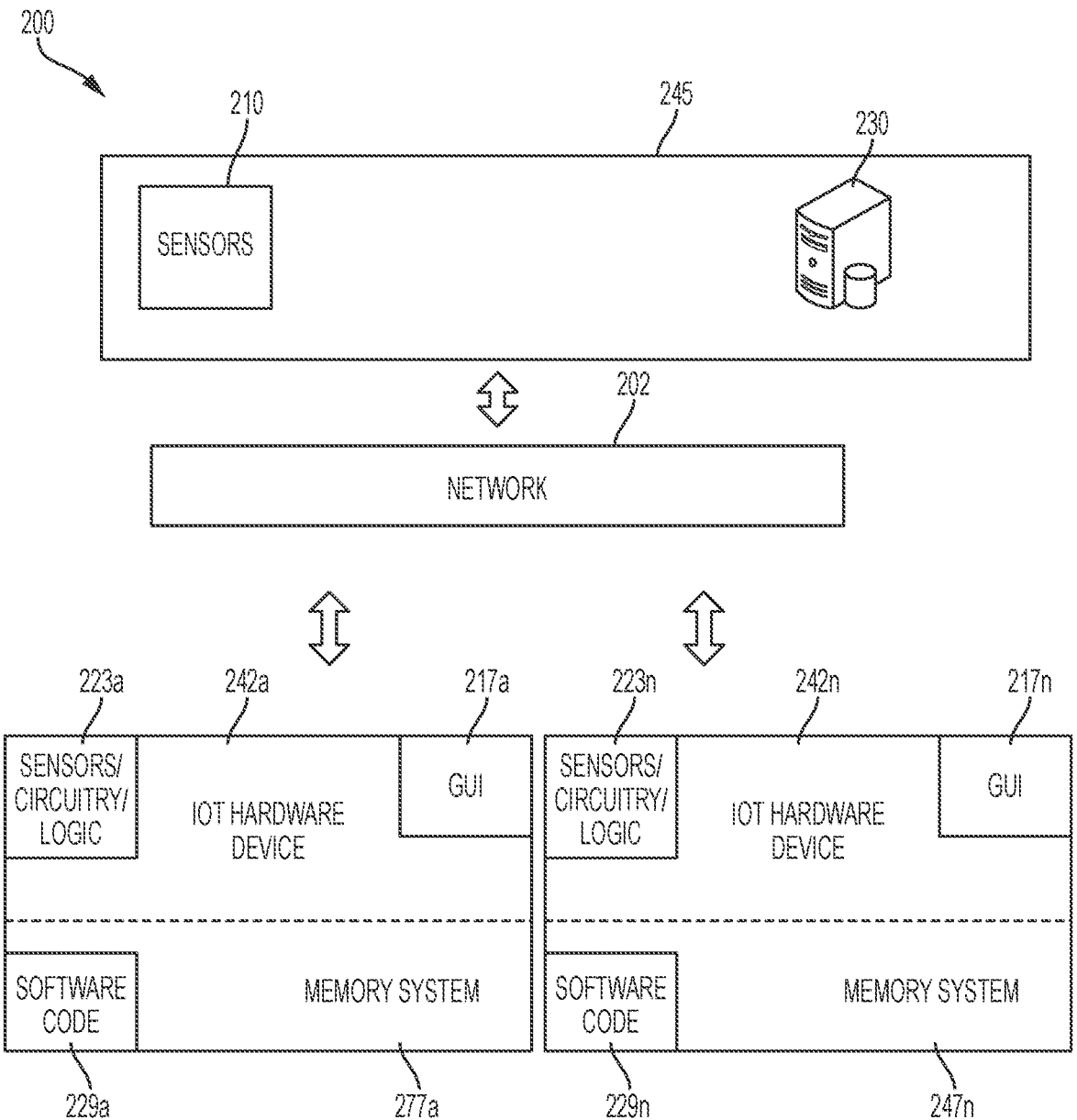
FIG. 2 illustrates a system for improving IoT device hardware and software technology associated with physical sensor triggered events by automatically detecting a user device and associated positioning information for improving an efficiency with respect to IoT device communications, in accordance with embodiments of the present invention.

FIG. 2 illustrates an alternative system 200 for improving IoT device hardware and software technology associated with physical sensor triggered events by automatically detecting a user device and associated positioning information for improving an efficiency with respect to IoT device communications, in accordance with embodiments of the present invention. In contrast to system 100 of FIG. 1, system 200 is enabled to automatically generate targeted promotions for users based on digital information retrieved physically (via physical sensors 210 in a physical geographical location 245 such as, inter alia, a retail location) via IoT hardware devices 242a . . . 242n and receive compensation from promoters for each promotion accessed by a user. System 100 enables a process that includes:

1. Associating a sequence of detected (physical) sensor triggered events with an advertisement for a product and automatically displaying the advertisement to a user executing an associated sensor triggered event.

2. Generating a modified (digital) version of the advertisement based at least one executed (by the user via the IoT device) physical sensor triggered event.

3. Transmitting (to the user) a first notification associated with the modified version of the advertisement.

4. Transmitting (to the advertiser) a second notification associated with compensation (e.g., via digital means) for transmitting the first notification.

System 200 of FIG. 1 includes a server hardware device (or hardware system) 230 connected through a network 202 to IoT hardware devices 242a . . . 242n. IoT hardware device 242a comprises sensors/circuitry/logic 223a, a graphical user interface (GUI) 217a, and a (specialized) memory system 277a. Memory system 277a comprises software code 229a. Memory system 277a may include a single memory system. Alternatively, memory system 277a may include a plurality of memory systems. IoT hardware device 242n comprises sensors/circuitry/logic 223n, a GUI 217n, and a (specialized) memory system 247n. Memory system 247n comprises software code 229n. Memory system 247n may include a single memory system. Alternatively, memory system 247n may include a plurality of memory systems. Server hardware device 230 and IoT hardware devices 242a . . . 242n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 230 and IoT hardware devices 242a . . . 242n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-8. The specialized discrete non-generic analog, digital, and logic based circuitry (e.g., sensors/circuitry/logic 223a . . . 223n, etc.) may include proprietary specially designed components (e.g., a specialized integrated circuit, such as for example an Application Specific Integrated Circuit (ASIC) designed for only implementing an automated process for improving IoT device hardware and software technology associated with physical sensor triggered events by automatically detecting a user device and associated positioning information for improving an efficiency with respect to mobile device communications. Sensors/circuitry/logic 223a . . . 223n may include any type of internal or external sensors including, inter alia, GPS sensors, activity tracking sensors, a heart rate monitor, a blood pressure monitor, a temperature sensor, a pulse rate monitor, an ultrasonic sensor, an optical sensor, a video retrieval device, humidity sensors, voltage sensors, etc. Network 7 may include any type of network including, inter alia, a local area network, (LAN), a wide area network (WAN), the Internet, a wireless network, etc.

Figure 3:
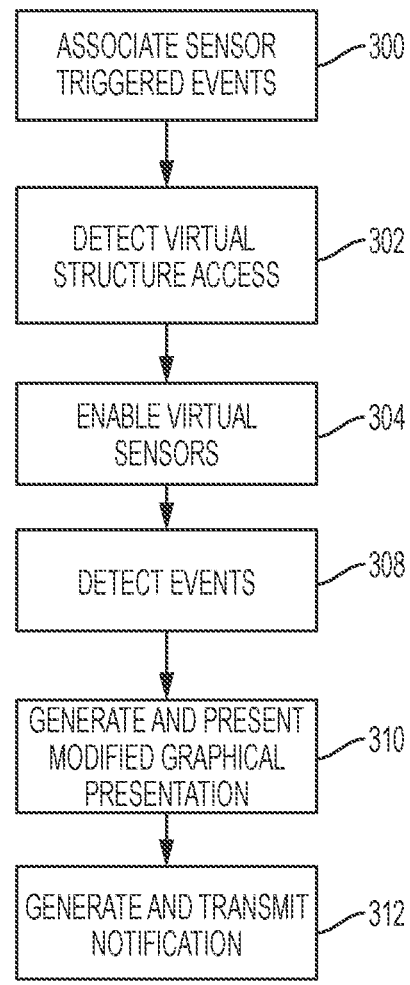
FIG. 3 illustrates an algorithm detailing a process flow enabled by the system of FIG. 1 for improving IoT device hardware and software technology associated with virtual sensor triggered events by automatically detecting a user device and associated positioning information for improving an efficiency with respect to IoT device communications, in accordance with embodiments of the present invention.

FIG. 3 illustrates an algorithm detailing a process flow enabled by system 100 of FIG. 1 for improving IoT device hardware and software technology associated with virtual sensor triggered events by automatically detecting a user device and associated positioning information for improving an efficiency with respect to IoT device communications, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by server hardware device 23 and IoT hardware devices 14a . . . 14n of FIG. 1. In step 300, a sequence of virtual sensor triggered events are associated with a graphical presentation for an object. In step 302, it is detected (via virtual software sensors of the IoT hardware device) that a user has accessed a virtual structure associated with an entity. For example, detecting that the user has accessed the virtual structure may include virtually detecting the accessing specified areas within the virtual structure via specialized software structures (e.g., a Website, a secure server, etc.). In step 304, a plurality of automated virtual sensors associated with the virtual structure are enabled in response to execution of step 302. In step 308, specified events of the sequence of virtual sensor triggered events triggered via the IoT device are detected detecting via the plurality of automated virtual sensors. In step 310, a modified graphical presentation associated with the graphical presentation for said object is generated and presented to the user via a specialized GUI. Generating the modified graphical presentation may include adding or removing the specified events to/from the original graphical presentation. Alternatively, generating the modified graphical presentation may include modifying the specified events. In step 312, a notification indicating the modified graphical presentation and an associated compensation action is generated and transmitted to a vendor associated with the object.

Figure 4:
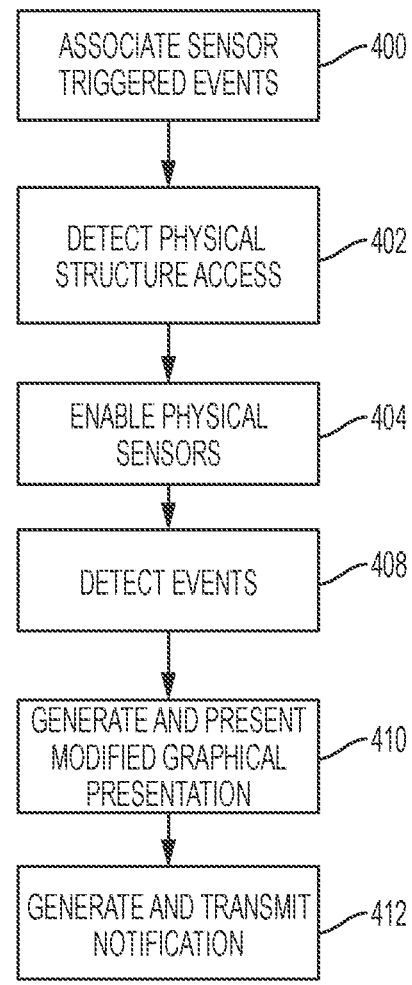
FIG. 4 illustrates an algorithm detailing a process flow enabled by the system of FIG. 1 for improving IoT device hardware and software technology associated with physical sensor triggered events by automatically detecting a user device and associated positioning information for improving an efficiency with respect to IoT device communications, in accordance with embodiments of the present invention.

FIG. 4 illustrates an algorithm detailing a process flow enabled by system 200 of FIG. 2 for improving IoT device hardware and software technology associated with physical sensor triggered events by automatically detecting a user device and associated positioning information for improving an efficiency with respect to IoT device communications, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by server hardware device 230 and IoT hardware devices 242a . . . 242n of FIG. 1. In step 400, a sequence of physical sensor triggered events are associated with a graphical presentation for an object. In step 402, it is detected (via physical hardware sensors of the IoT hardware device) that a user has accessed a physical structure (at a geographical location) associated with an entity. Detecting that the user has entered the physical structure may include detecting that the user has entered specified geographical locations within the physical structure via usage of sensor based technology such as, inter alia, Wi fi based triangulation technology, Bluetooth technology, smart shelf technology, video camera technology, augmented reality sensor based technology, etc. In step 404, a plurality of automated physical sensors associated with the physical structure are enabled in response to execution of step 402. In step 408, specified events of the sequence of physical sensor triggered events triggered via the IoT device are detected via the plurality of automated physical sensors. In step 410, a modified graphical presentation associated with the graphical presentation for said object is generated and presented to the user via a specialized GUI. Generating the modified graphical presentation may include adding or removing the specified events to/from the original graphical presentation. Alternatively, generating the modified graphical presentation may include modifying the specified events. In step 412, a notification indicating the modified graphical presentation and an associated compensation action is generated and transmitted to a vendor associated with the object.

Figure 5A:
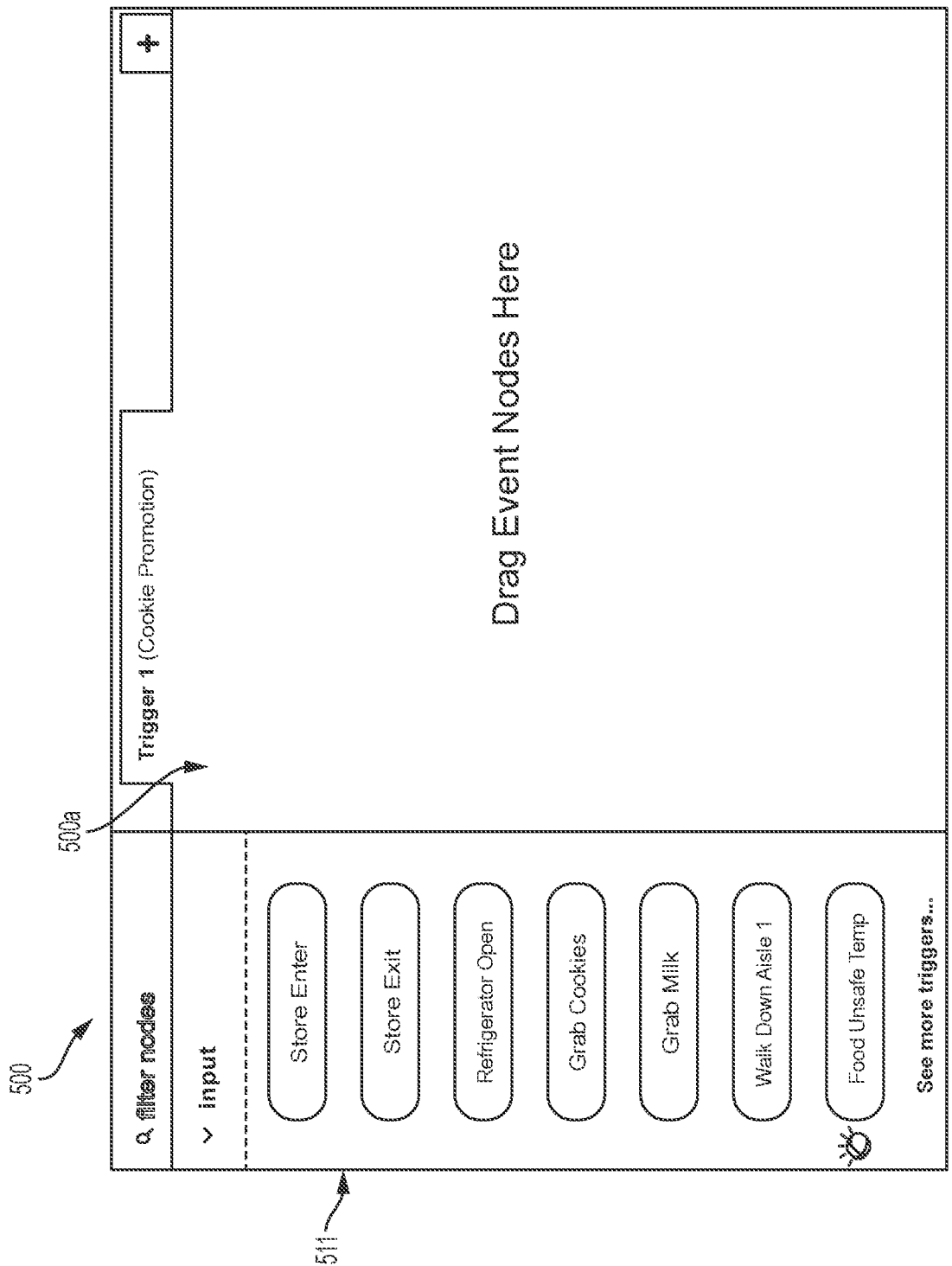
FIGS. 5A, 5B and 5C, in combination, illustrate an implementation example enabling the systems of FIGS. 1 and 2 enabling a sensor triggered event based advertising process, in accordance with embodiments of the present invention.
Figure 5B:
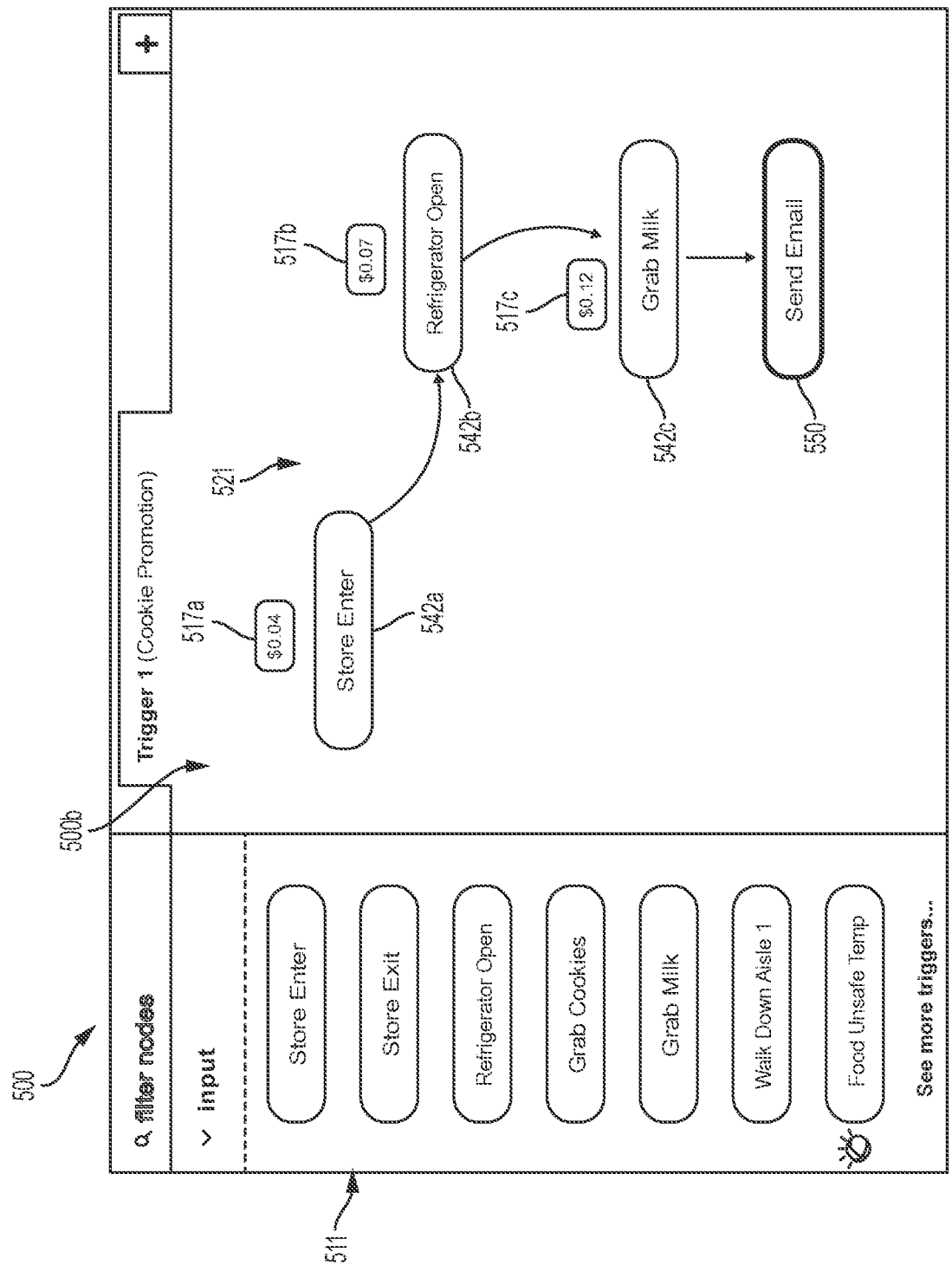
Figure 5C:
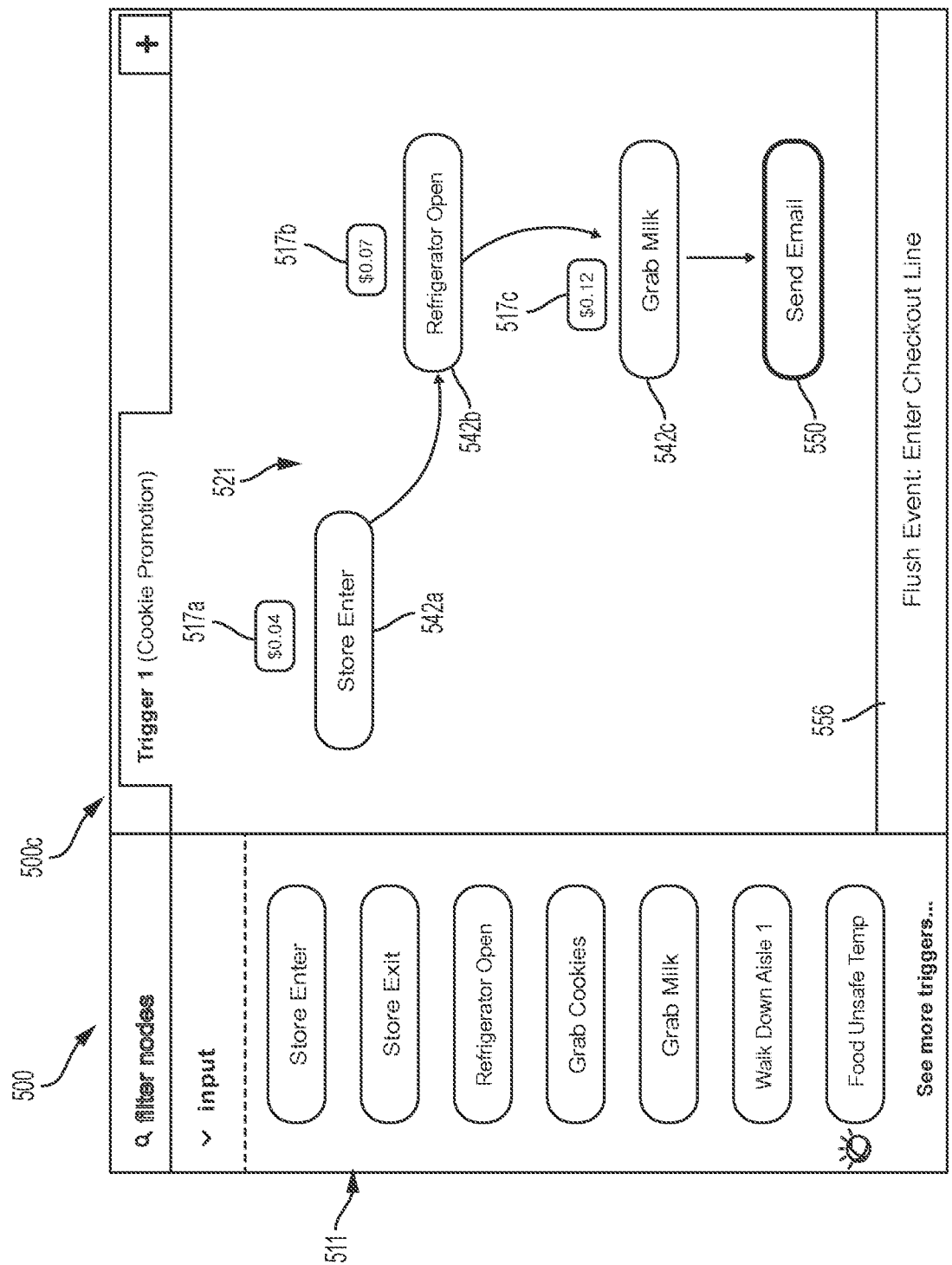

FIGS. 5A, 5B and 5C, in combination, illustrate an implementation example enabling systems 100 and 200 of FIGS. 1 and 2 enabling a sensor triggered event based advertising process, in accordance with embodiments of the present invention. The example illustrated in FIGS. 5A-5C executes a software application for allowing advertiser (hardware and software) systems to automatically generate sensor enabled advertising and allowing facilities to receive compensation for enabling hardware and software sensor infrastructure inputs. For example, a company A comprises facilities that include sensing technologies such as, inter alia, WIFI triangulation sensors, proximity (BLE) beacons, video cameras, smart shelves, smart digital signage systems, etc. The aforementioned advertisement system is configured to provide compensation and present and promote items for sale described as follows:

A company A (e.g., a retail facility) configures a hardware system for enabling sensing publisher code resulting in automated communications between the hardware system and IoT devices (comprising a specialized software development kit for feeding data into the IoT devices) belonging to users. Likewise, a company B (e.g., a product manufacturer) requests usage of the hardware system for promoting a product. In response, company B is authorized to access the specialized software development kit for identifying venues and publishers for event triggering. For example, company B selects events from company A and accesses a management portal associated with the specialized software development for event funnel generation. The management portal access is enabled via a GUI 500 of FIG. 5A for presenting a blank configuration 500a for generating a funnel with all available sensing triggers 511. Sensing triggers 511 may include, inter alia, entering and exiting a venue, identifying unsafe food temperatures, specified food selections, etc.

FIG. 5B illustrates company B generating (via a configuration 500b) a trigger 521 (for users) comprising nodes: entering a store 542a, opening a refrigerator 542b, and grabbing milk 542c. Configuration 500b illustrates a specified funnel and associated advertiser prices 517a . . . 517c (determined via sensor enabled triggers) associated with event nodes 542a . . . 542c.

FIG. 5C illustrates company B generating a flush event 556 associated with users that do not execute all nodes 542a . . . 542c of trigger 521. In response, an email 550 is transmitted to company B systems and all users. Therefore, if a first user accesses node: store enter 542a, a coupon is issued to the first user during a checkout process.

Figure 6:
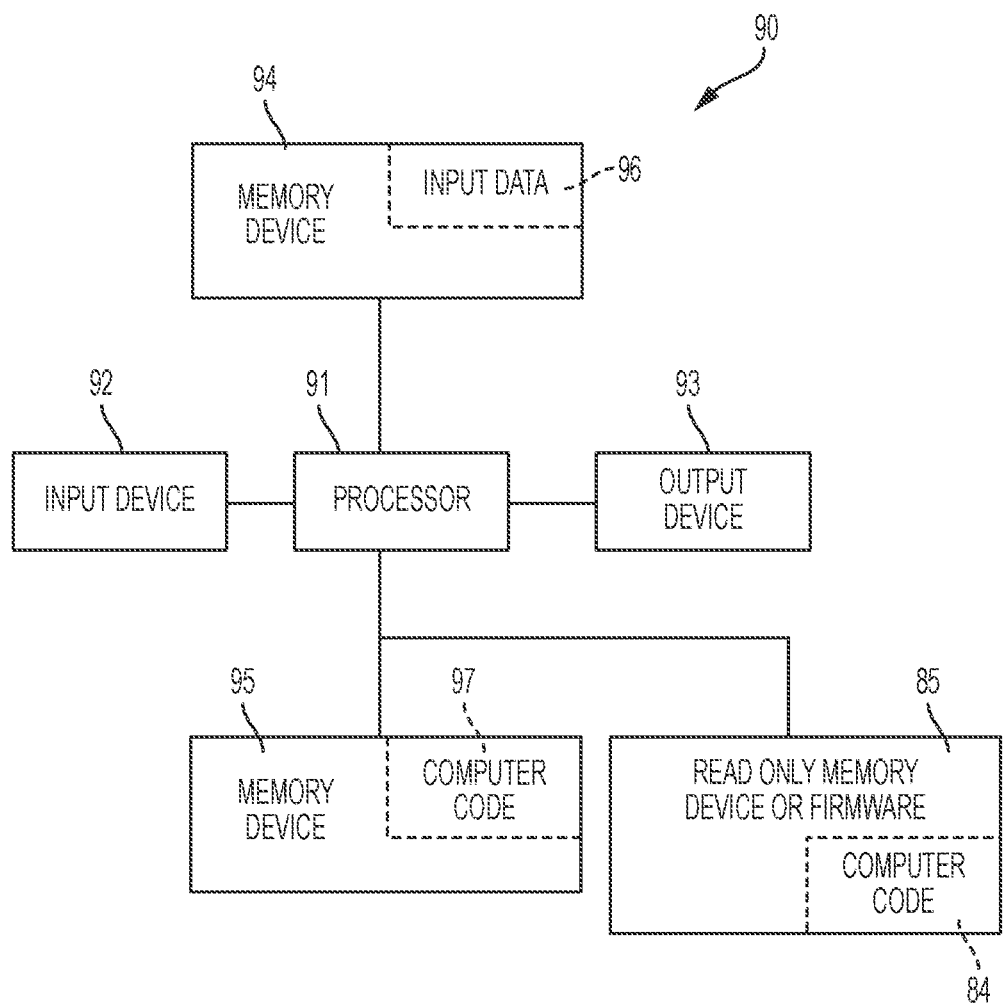
FIG. 6 illustrates a computer system used by the system of FIG. 1 for improving IoT device hardware and software technology associated with virtual or physical sensor triggered events by automatically detecting a user device and associated positioning information for improving an efficiency with respect to IoT device communications, in accordance with embodiments of the present invention.

FIG. 6 illustrates a computer system 90 (e.g., server hardware device 23 and IoT hardware devices 14a . . . 14n of FIG. 1 and server hardware device 230 and IoT hardware devices 242a . . . 242n of FIG. 1) used by or comprised by the system of FIG. 1 for improving IoT device hardware and software technology associated with virtual or physical sensor triggered events by automatically detecting a user device and associated positioning information for improving an efficiency with respect to IoT device communications, in accordance with embodiments of the present invention, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for improving IoT device hardware and software technology associated with virtual or physical sensor triggered events by automatically detecting a user device and associated positioning information for improving an efficiency with respect to IoT device communications. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 3 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve IoT device hardware and software technology associated with virtual or physical sensor triggered events by automatically detecting a user device and associated positioning information for improving an efficiency with respect to IoT device communications. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving IoT device hardware and software technology associated with virtual or physical sensor triggered events by automatically detecting a user device and associated positioning information for improving an efficiency with respect to IoT device communications. In another embodiment, the invention provides a business method that performs the process steps of the invention on a subscription, advertising, and/or fee basis. That is, a service supplier, such as a Solution Integrator, could offer to enable a process for improving IoT device hardware and software technology associated with virtual or physical sensor triggered events by automatically detecting a user device and associated positioning information for improving an efficiency with respect to IoT device communications. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
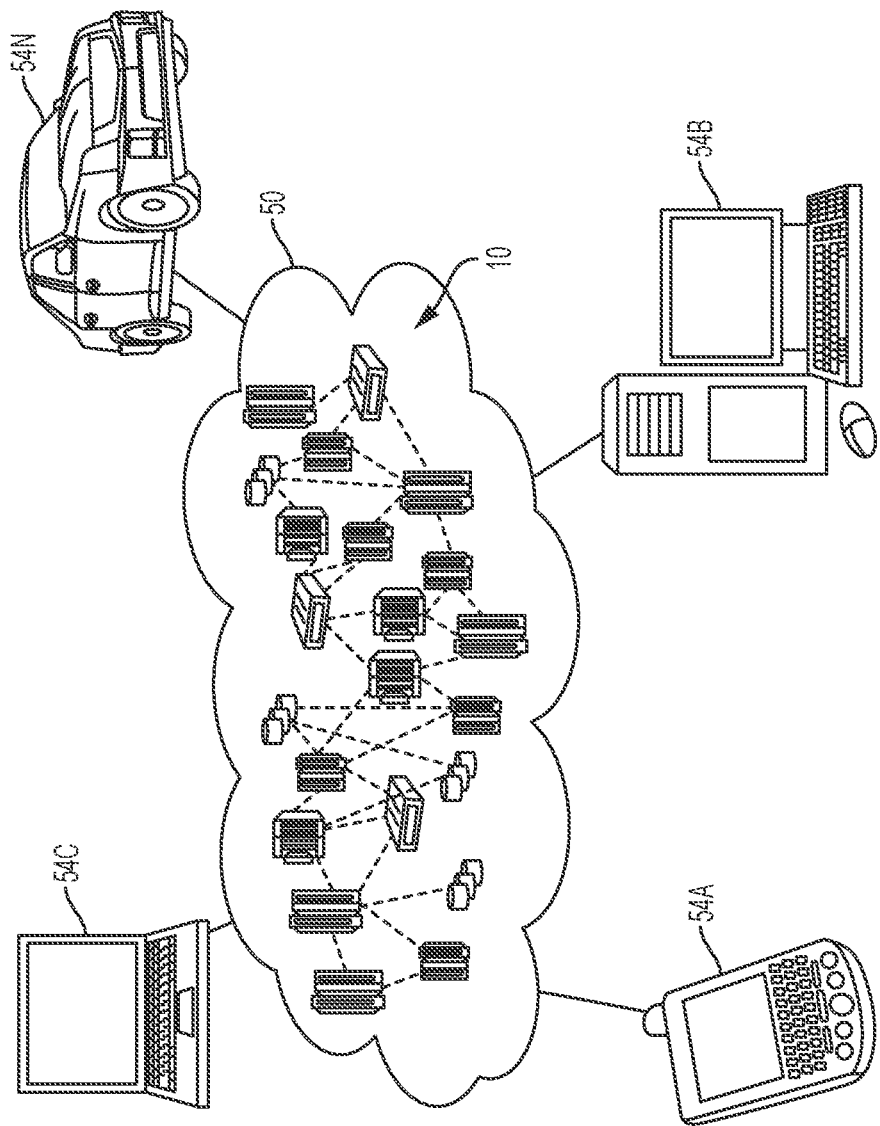
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
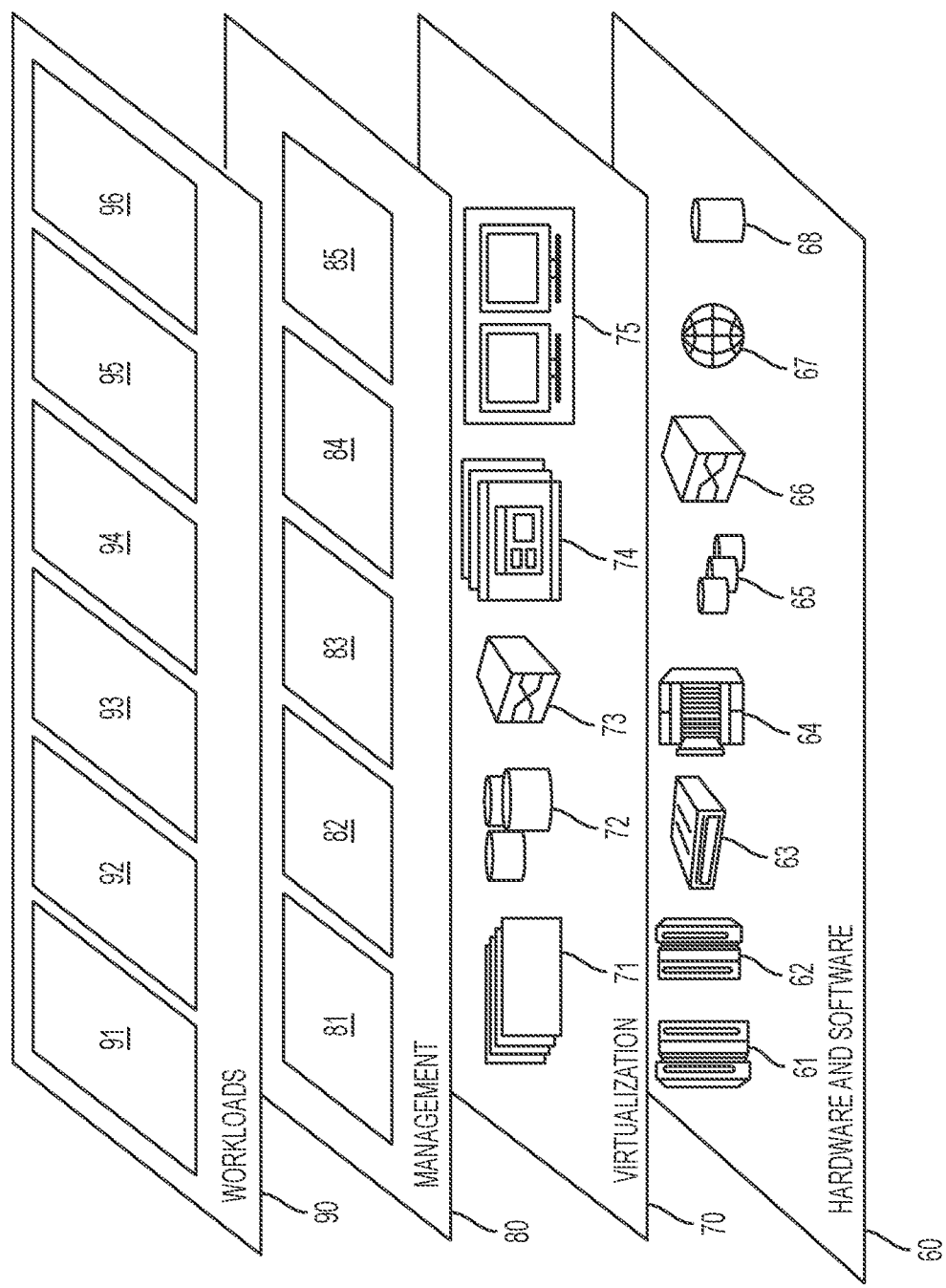
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving IoT device hardware and software technology associated with virtual or physical sensor triggered events by automatically detecting a user device and associated positioning information for improving an efficiency with respect to IoT device communications 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A virtual sensor triggered event presentation improvement method comprising:
   associating, by a processor of a hardware device, a sequence of sensor triggered events with a graphical presentation for an object, wherein said sequence of sensor triggered events are associated with perishable item associated triggers, geographical location triggers, and hardware and software nodes for executing said sequence of sensor triggered events;
   detecting, by said processor via a plurality of virtual sensors of said hardware device, that a user of said hardware device has accessed a virtual structure associated with an entity;
   enabling, by said processor based on said detecting, a plurality of automated virtual sensors associated with said virtual structure;
   detecting, by said processor via said plurality of automated virtual sensors, specified events of said sequence of sensor triggered events triggered by said user via said hardware device;
   determining, by said processor, parameters associated with a user profile of said user with respect to: restricting media types of said graphical presentation for said object and restricting notifications for transmission during specified time frames;
   generating, by said processor, a flush event associated with actions triggered via detection that said user does not execute all of said hardware and software nodes;
   generating, by said processor based on said detecting and said parameters and said flush event, a modified graphical presentation associated with said graphical presentation for said object, wherein said modified graphical presentation comprises a modified digital version of said graphical presentation;
   presenting, by said processor to said user, said modified graphical presentation;
   generating, by said processor, a notification indicating said modified graphical presentation and an associated compensation action; and
   transmitting, by said processor to a vendor associated with said object, said notification.

2. The method of claim 1, wherein said detecting that said user has accessed said virtual structure comprises virtually detecting via specialized software structures, said user accessing specified areas within said virtual structure via specialized software structures.

3. The method of claim 2, wherein said virtual structure comprises a Website associated with said entity.

4. The method of claim 2, wherein said virtual structure comprises a secure server of said entity.

5. The method of claim 1, wherein said generating said modified graphical presentation comprises adding said specified events to said graphical presentation for said object.

6. The method of claim 1, wherein said generating said modified graphical presentation comprises removing said specified events from said graphical presentation for said object.

7. The method of claim 1, wherein said generating said modified graphical presentation comprises modifying said specified events for said graphical presentation for said object.

8. The method of claim 1, further comprising:
   providing at least one support service for at least one of creating, integrating, hosting, maintaining, and deploying computer-readable code in the control hardware, said code being executed by the computer processor to implement: said associating, said detecting that said user has accessed said virtual structure, said enabling, said detecting said specified events, said generating said modified graphical presentation, said presenting, said generating said notification, and said transmitting.

9. A computer program product, comprising a computer readable hardware storage device storing a computer readable program code, said computer readable program code comprising an algorithm that when executed by a processor of a hardware device implements a virtual sensor triggered event presentation improvement method, said method comprising:
   associating, by said processor, a sequence of sensor triggered events with a graphical presentation for an object, wherein said sequence of sensor triggered events are associated with perishable item associated triggers, geographical location triggers, and hardware and software nodes for executing said sequence of sensor triggered events;
   detecting, by said processor via a plurality of virtual sensors of said hardware device, that a user of said hardware device has accessed a virtual structure associated with an entity;
   enabling, by said processor based on said detecting, a plurality of automated virtual sensors associated with said virtual structure;
   detecting, by said processor via said plurality of automated virtual sensors, specified events of said sequence of sensor triggered events triggered by said user via said hardware device;
   determining, by said processor, parameters associated with a user profile of said user with respect to: restricting media types of said graphical presentation for said object and restricting notifications for transmission during specified time frames;
   generating, by said processor, a flush event associated with actions triggered via detection that said user does not execute all of said hardware and software nodes;
   generating, by said processor based on said detecting and said parameters and said flush event, a modified graphical presentation associated with said graphical presentation for said object, wherein said modified graphical presentation comprises a modified digital version of said graphical presentation;
   presenting, by said processor to said user, said modified graphical presentation;
   generating, by said processor, a notification indicating said modified graphical presentation and an associated compensation action; and
   transmitting, by said processor to a vendor associated with said object, said notification.

10. The computer program product of claim 9, wherein said detecting that said user has accessed said virtual structure comprises virtually detecting via specialized software structures, said user accessing specified areas within said virtual structure via specialized software structures.

11. The computer program product of claim 10, wherein said virtual structure comprises a Website associated with said entity.

12. The computer program product of claim 10, wherein said virtual structure comprises a secure server of said entity.

13. The computer program product of claim 9, wherein said generating said modified graphical presentation comprises adding said specified events to said graphical presentation for said object.

14. The computer program product of claim 9, wherein said generating said modified graphical presentation comprises removing said specified events from said graphical presentation for said object.

15. The computer program product of claim 9, wherein said generating said modified graphical presentation comprises modifying said specified events for said graphical presentation for said object.

16. A hardware device comprising a processor coupled to a computer-readable memory unit, said memory unit comprising instructions that when executed by the computer processor implements a virtual sensor triggered event presentation improvement method comprising:

associating, by said processor, a sequence of sensor triggered events with a graphical presentation for an object, wherein said sequence of sensor triggered events are associated with perishable item associated triggers, geographical location triggers, and hardware and software nodes for executing said sequence of sensor triggered events;

detecting, by said processor via a plurality of virtual sensors of said hardware device, that a user of said hardware device has accessed a virtual structure associated with an entity;

enabling, by said processor based on said detecting, a plurality of automated virtual sensors associated with said virtual structure;

detecting, by said processor via said plurality of automated virtual sensors, specified events of said sequence of sensor triggered events triggered by said user via said hardware device;

determining, by said processor, parameters associated with a user profile of said user with respect to: restricting media types of said graphical presentation for said object and restricting notifications for transmission during specified time frames;

generating, by said processor, a flush event associated with actions triggered via detection that said user does not execute all of said hardware and software nodes;

generating, by said processor based on said detecting and said parameters and said flush event, a modified graphical presentation associated with said graphical presentation for said object, wherein said modified graphical presentation comprises a modified digital version of said graphical presentation;

presenting, by said processor to said user, said modified graphical presentation;

generating, by said processor, a notification indicating said modified graphical presentation and an associated compensation action; and transmitting, by said processor to a vendor associated with said object, said notification.

17. A physical sensor triggered event presentation improvement method comprising:

associating, by a processor of a hardware device, a sequence of sensor triggered events with a graphical presentation for an object, wherein said sequence of sensor triggered events are associated with perishable item associated triggers, geographical location triggers, and hardware and software nodes for executing said sequence of sensor triggered events;

detecting, by said processor via a plurality of sensors of said hardware device, that a user of said hardware device has entered a physical structure associated with an entity;

enabling, by said processor based on said detecting, a plurality of automated physical sensors associated with said physical structure;

detecting, by said processor via said plurality of automated physical sensors, specified events of said sequence of sensor triggered events triggered by said user via said hardware device;

determining, by said processor, parameters associated with a user profile of said user with respect to: restricting media types of said graphical presentation for said object and restricting notifications for transmission during specified time frames;

generating, by said processor, a flush event associated with actions triggered via detection that said user does not execute all of said hardware and software nodes;

generating, by said processor based on said detecting and said parameters and said flush event, a modified graphical presentation associated with said graphical presentation for said object, wherein said modified graphical presentation comprises a modified digital version of said graphical presentation;

presenting, by said processor to said user, said modified graphical presentation;

generating, by said processor, a notification indicating said modified graphical presentation and an associated compensation action; and transmitting, by said processor to a vendor associated with said object, said notification.

18. The method of claim 17, wherein said detecting that said user has entered said physical structure further comprises detecting that said user has entered specified geographical locations within said physical structure.

19. The method of claim 18, wherein said detecting that said user has entered said specified geographical locations within said physical structure comprises detecting via sensor based technology selected from the group consisting of Wi fi based triangulation technology, Bluetooth technology, smart shelf technology, video camera technology, and augmented reality sensor based technology.

20. The method of claim 17, wherein said generating said modified graphical presentation comprises adding said specified events to said graphical presentation for said object.

21. The method of claim 17, wherein said generating said modified graphical presentation comprises removing said specified events from said graphical presentation for said object.

22. The method of claim 17, wherein said generating said modified graphical presentation comprises modifying said specified events for said graphical presentation for said object.

23. A computer program product, comprising a computer readable hardware storage device storing a computer readable program code, said computer readable program code comprising an algorithm that when executed by a processor of a hardware device implements a physical sensor triggered event presentation improvement method, said method comprising:

associating, by said processor, a sequence of sensor triggered events with a graphical presentation for an object, wherein said sequence of sensor triggered events are associated with perishable item associated triggers, geographical location triggers, and hardware and software nodes for executing said sequence of sensor triggered events;

detecting, by said processor via a plurality of sensors of said hardware device, that a user of said hardware device has entered a physical structure associated with an entity;

enabling, by said processor based on said detecting, a plurality of automated physical sensors associated with said physical structure;

detecting, by said processor via said plurality of automated physical sensors, specified events of said sequence of sensor triggered events triggered by said user via said hardware device;

determining, by said processor, parameters associated with a user profile of said user with respect to: restricting media types of said graphical presentation for said object and restricting notifications for transmission during specified time frames;

generating, by said processor, a flush event associated with actions triggered via detection that said user does not execute all of said hardware and software nodes;

generating, by said processor based on said detecting and said parameters and said flush event, a modified graphical presentation associated with said graphical presentation for said object, wherein said modified graphical presentation comprises a modified digital version of said graphical presentation;

presenting, by said processor to said user, said modified graphical presentation;

generating, by said processor, a notification indicating said modified graphical presentation and an associated compensation action; and transmitting, by said processor to a vendor associated with said object, said notification.

24. The computer program product of claim 23, wherein said detecting that said user has entered said physical structure further comprises detecting that said user has entered specified geographical locations within said physical structure.

25. The computer program product of claim 24, wherein said detecting that said user has entered said specified geographical locations within said physical structure comprises detecting via sensor based technology selected from the group consisting of Wi fi based triangulation technology, Bluetooth technology, smart shelf technology, video camera technology, and augmented reality sensor based technology.

* * * * *